Oct. 5, 1971          H. WIEST          3,609,838

MACHINE TOOL

Filed Sept. 23, 1968          5 Sheets-Sheet 1

INVENTOR
Horst Wiest
BY Jacobi and Ila

United States Patent Office 3,609,838
Patented Oct. 5, 1971

3,609,838
MACHINE TOOL
Horst Wiest, 10 Lisztstrasse, 731 Plochingen
(Neckar), Germany
Filed Sept. 23, 1968, Ser. No. 761,745
Int. Cl. B23q 7/02, 39/04
U.S. Cl. 29—38                                    15 Claims

ABSTRACT OF THE DISCLOSURE

A machine tool with a relatively large annular work table which is rotatable in steps from one work station to another and at the inside and outside of which several motor-driven tools may be mounted at each work station for machining several workpieces simultaneously. For compensating inaccuracies of the dimensions and movements of this work table, a plurality of work supports in accordance with the number of work stations may be adjustably mounted on the work table and each of these work supports carrying a workpiece may be adjusted at each work station to the accurate position required for the respective work.

---

The present invention relates to a machine tool for machining simultaneously at least two, and preferably three or more equal workpieces at different points which are disposed at an angle to each other. This machine comprises an annular work table on which the workpieces are to be mounted and which is rotatable in steps at any desired frequency, and at least two groups of work units each of which is provided with one or more work or tool spindles and with a separate motor for driving these spindles. Each of these groups of work units constitute one work station of the machine.

In the operation of such machine tools of prior designs which are provided with annular work tables of a central diameter of about 1000 to 3500 mm. it has been found that because of unavoidable deviations in the dimensions of the annular table and its movements and because of the thermal expansion of the table, it is impossible to stop the table always in the exact positions in which the workpieces should be in relation to the tools on the work spindles of the different work units. Consequently, the work carried out by these machines is often very inaccurate.

It is an object of the present invention to provide a machine tool of the type as described above which permits each workpiece when stopped at a work station after each partial rotation of the annular table and before being machined by the work units of this station to be accurately adjusted to and locked in the particular position in which the work should be carried out.

For attaining this object, the invention provides that several work supports in accordance with the number of work stations of the machine are mounted at substantially equal peripheral distances from each other on the annular work table in a manner so as to be slideable within certain limits relative to the table, and that by the provision of suitable adjusting or indexing and clamping elements at each work station, each work support carrying a workpiece will be automatically adjusted to and then clamped in the exact position in which the work is to be carried out on the workpiece by the group of work units of the respective work station. By mounting each work support in accordance with the invention so as to be slidable relative to the annular table, and by providing the adjusting and clamping elements at each work station, each work support may be very accurately adjusted to the required position at each work station independently of the particular position in which the annular table might be stopped. Consequently, the invention permits each workpiece to be adjusted and locked at every work station in the exact position in which it should be relative to the group of tools of that station without being affected by the mechanical inaccuracies and the thermal expansion of the annular table and the inaccuracies of its intermittent movements. This is especially of advantage if the annular table of such a machine has a large diameter amounting, for example, to 1000 to 3500 mm.

Another feature of the invention consists in providing a plurality of carrier pins or the like on the upper side of the annular work table, in providing each work support with at least one aperture into which one of these carrier pins projects with a certain amount of play, and in providing a spring between the work table and each work support which tends to lift the latter off the work table and thus acts in the direction opposite to that in which the work support is to be clamped upon the work table. These means permit each work support be easily adjusted relative to the annular work table.

Another important feature of the invention consists in providing each work support laterally of the annular work table with at least one centering member and at least one clamping member each of which has a longitudinal slot extending in the peripheral direction of the annular work table. In addition, each centering member is provided with a conical centering surface and each clamping member is provided with a clamping surface. Each adjusting and indexing element and each clamping element is secured to one end of a rod which is movable in its axial direction to effect the adjusting and clamping operations or to release the respective work support. Each indexing element is provided with a conical centering surface which is adapted to engage with the corresponding surface on the centering member, and each clamping element is provided with a clamping surface which is adapted to engage with the corresponding clamping surface of the clamping member.

The associated centering and clamping members may also be combined with each other so as to form a single element which has a longitudinal slot, a conical centering surface, and a clamping surface. The same applies to the associated indexing and clamping elements so that the combined element is then secured to a longitudinally movable rod and has a conical centering surface and a clamping surface which are adapted to engage with the corresponding surfaces of the combined centering and clamping members.

If the rod which carries the indexing element and/or the clamping element forms the piston rod of a hydraulic jack and this piston rod is slidable in a bushing which is accurately adjustable in a bore in the machine frame and on which the cylinder of the hydraulic jack is secured, and if the piston rod is further associated with a stop and/or with a limit switch which is mounted on the cylinder of the jack, the entire indexing and/or clamping mechanism may be designed as a structural unit and all of these units may be of the same construction. By means of the bushing, this unit may be mounted and adjusted in a simple manner on the machine frame.

The features and advantages of the present invention will become further apparent from the following detailed description theerof which is to be read with reference to the accompanying drawings, in which—

FIG. 5 shows an enlarged cross section which is taken along the line V—V of FIG. 3; while

Figure 1:
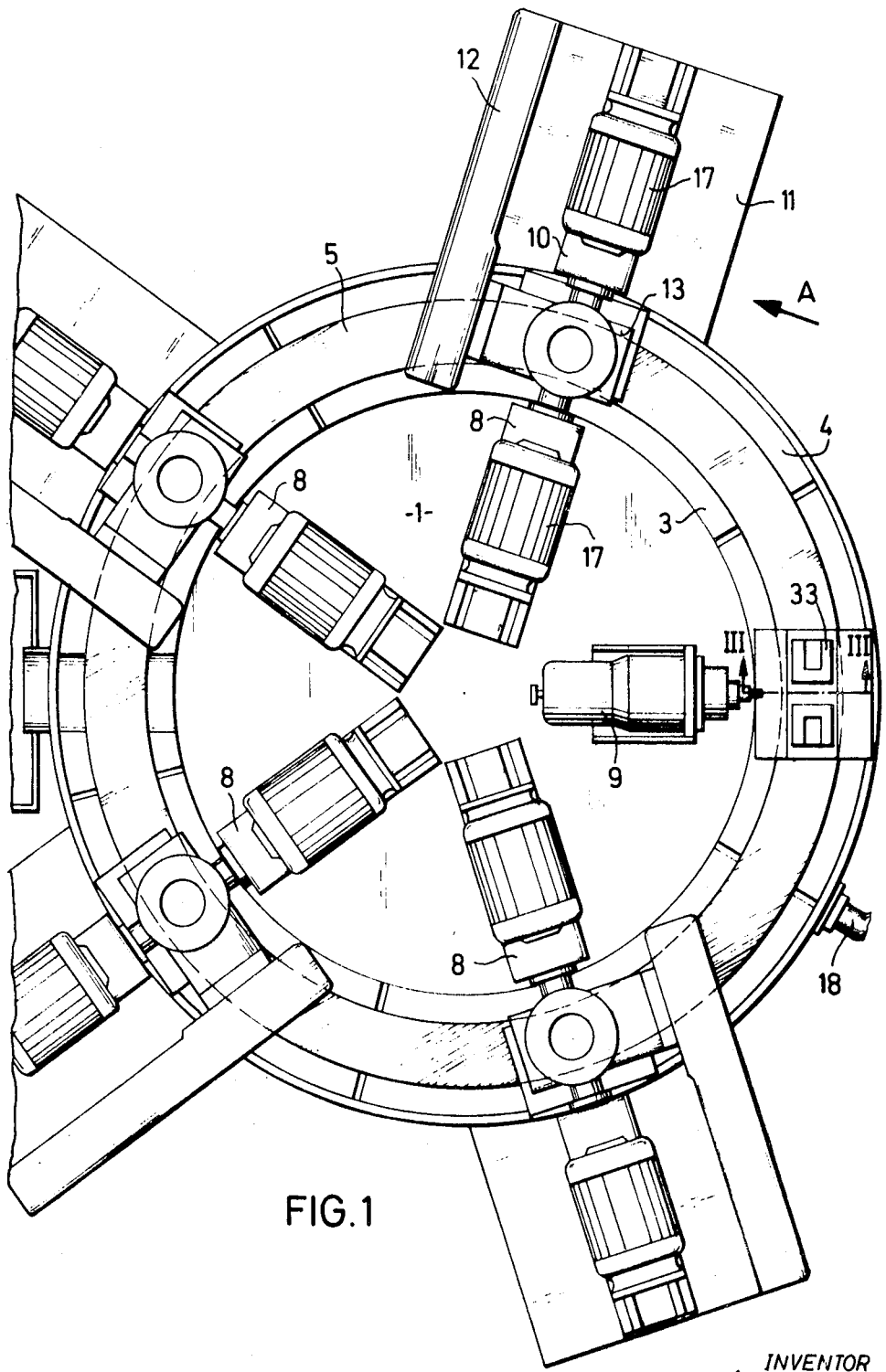
FIG. 1 shows a top view of a machine tool according to the invention which is provided with twelve work units.
Figure 2:
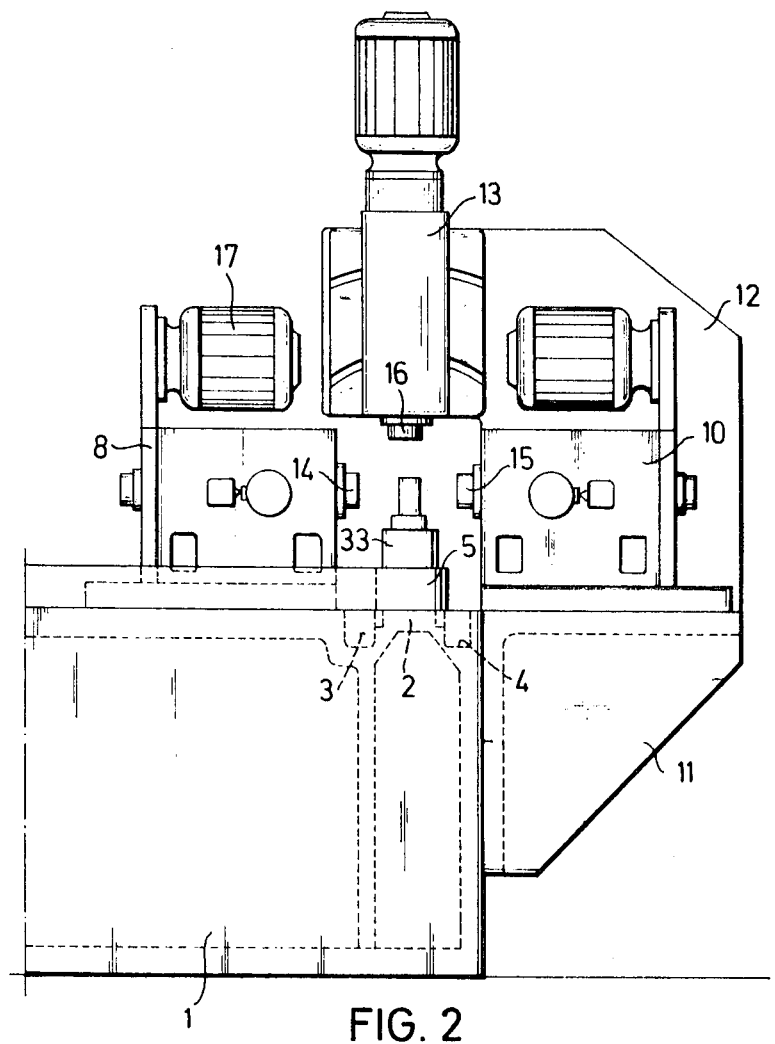
FIG. 2 shows a side view of a part of the machine according to FIG. 1 as seen therein in the direction of the arrow A.

As illustrated in the drawings, the machine tool according to the invention comprises a machine frame 1 which has integrally thereon a supporting ring 2 which is disposed between two annular chip grooves 3 and 4 and on which an annular work table 5 is mounted on an intermediate antifriction bearing 41 so as to be rotatable about its vertical axis.

At the inside of the annular work table 5 four work units 8 and a tightening and releasing unit 9 are mounted on frame 1 and are normally spaced at equal sector angles from each other. Opposite to each work unit 8 another similar work unit 10 is mounted at the outside of work table 5 on a supporting bracket 11 which is secured to the outside of frame 1. Each of these supporting brackets 11 carries a vertical supporting element 12 on which a further work unit 13 is mounted which normally extends vertically to and above the annular work table 5. All work units 8, 10, and 13 are provided with tool spindles 14, 15, and 16, respectively, and are movable with their spindles in their longitudinal directions. Thus, work units 8 and 10 are movable horizontally, while work units 13 are normally movable vertically. Work units 8, 10, and 13 form four groups and each of these groups forms one work station.

In order to make the machine of the smallest possible dimensions in radial direction of the annular work table 5, the driving motors 17 of the work units 8 and 10 are mounted vertically above their tool spindles 14 and 15 and drive the latter by angular drives, not shown. These spindles 14 and 15 and preferably also the tool spindles 16 only project so far from their housings as is necessary for mounting the tools thereon. This also assists in reducing the size of the machine in the radial directions of the work table, especially isofar as the work units 8 are concerned. The work table 5 is preferably designed to possess a diameter of about 1000 to 3500 mm. which also depends upon the length of the work units 8 and should be made as small as possible so as to permit the shifting periods of the workpieces from one work station to another to be made as short as possible. The work units should, however, have enough room to permit them to be pivoted, for example, about the position of the workpiece and for shifting them substantially parallel to the peripheral direction of the annular table 5 so that the tools may act in different directions upon differently shaped workpieces.

As indicated in FIG. 1, an arm or bracket 18 is secured to the machine frame for mounting thereon a control panel, not shown, on which the individual driving elements of the machine may be operated by means of control buttons. In order to permit the operator of the machine to sit next to the control panel, the machine frame 1 may be provided with a suitable recess, not shown.

Figure 3:
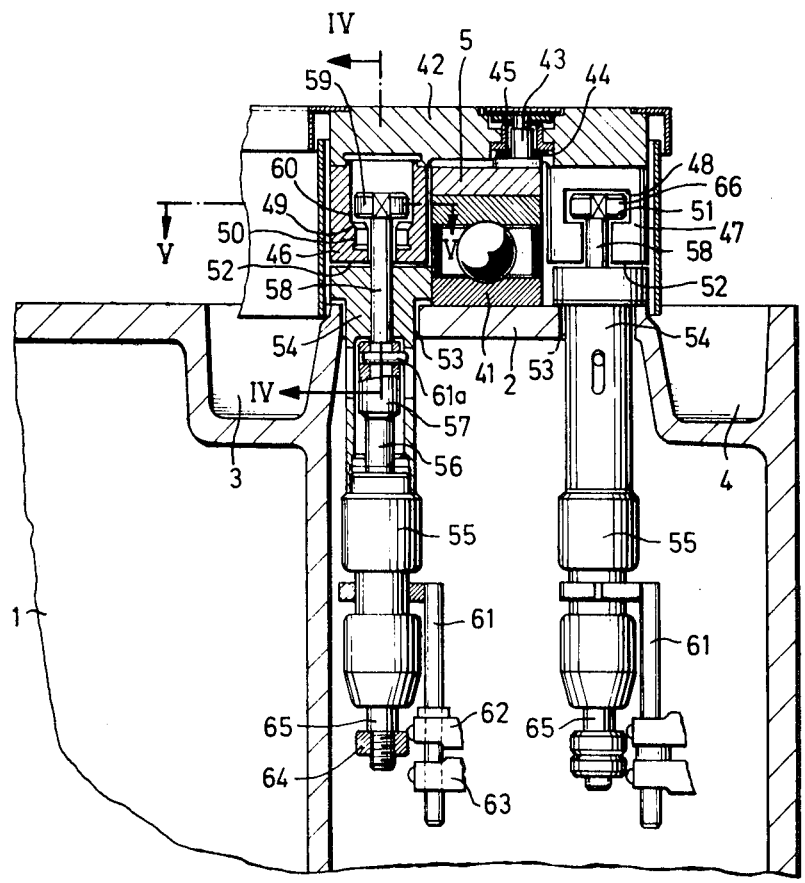
FIG. 3 shows an enlarged cross section which is taken along the line III—III of FIG. 1 of the annular work table.
Figure 4:
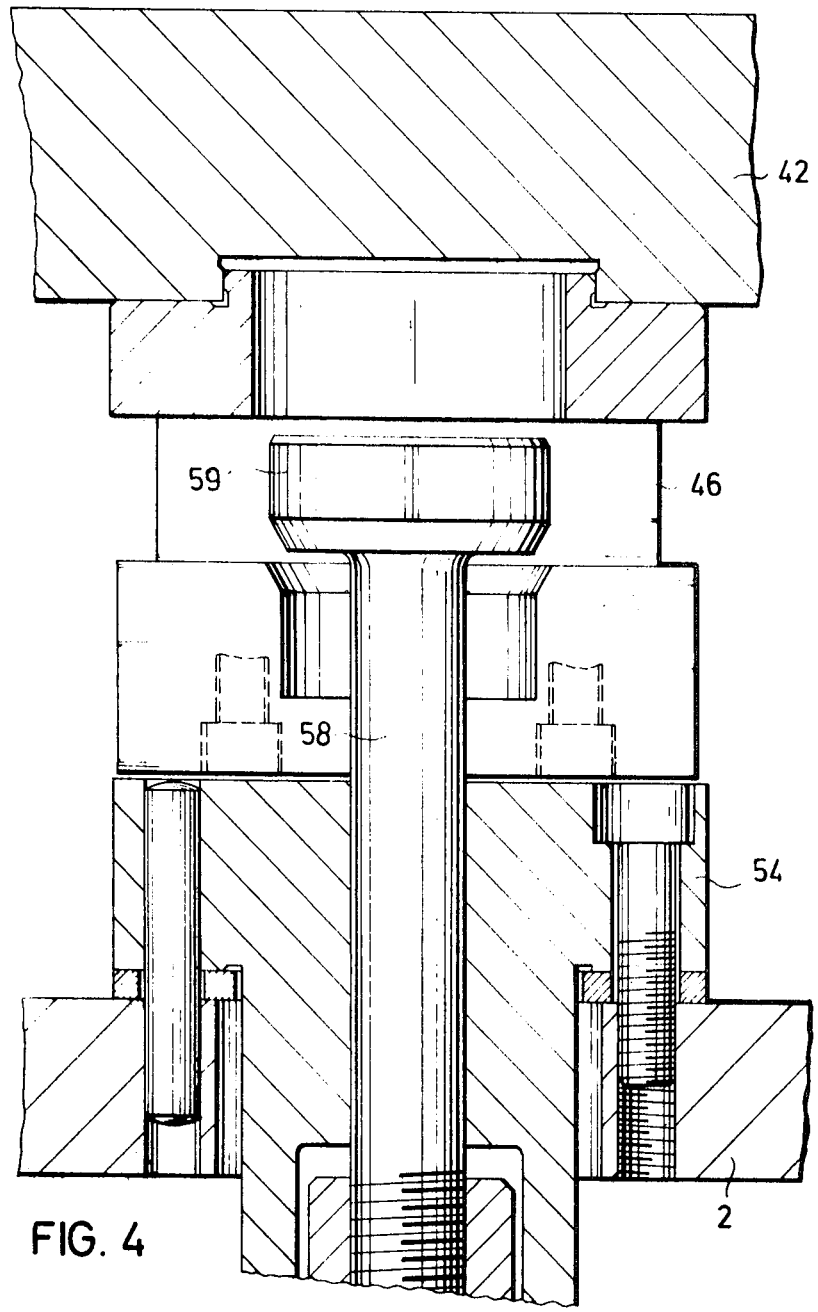
FIG. 4 shows an enlarged cross section which is taken along the line IV—IV of FIG. 3.

The annular table 5 carries a plurality of work supports 42, namely, one more than the number of groups of work units 8, 10, and 13 with which the machine is provided. On each of these work supports 42 a workpiece is to be mounted either directly or indirectly. Each of these work supports 42 is provided with apertures into which at least two carrier pins 43 project which are secured to the annular table 5 and only one of which is shown in FIG. 3. Between these carrier pins 43 and each work support 42 there is a sufficient clearance so as to permit the work support 42 to be adjusted relative to the annular table 5. This clearance is made larger in the peripheral direction than in the radial direction. Between the annular table 5 and each work support 42 a spring 44 is provided which tends to lift the work support off the annular table 5. The distance which the work support 42 may be lifted off the annular table 5 may be limited by an adjusting nut 45. The aperture for receiving each carrier pin 43 is covered by suitable means at the upper side. The side of each work support 42 facing the supporting ring 2 is provided laterally of the antifriction bearing 41 with two or more centering members 46 and two or more clamping members 47. In FIG. 3 only one of each of these members 46 and 47 is visible since they are disposed behind each other. Each of these members 46 and 47 has a slot 48 which extends in the peripheral direction of the annular table 5 and has a T-shaped cross section, as seen in the radial direction of table 5. At the inside of each centering member 46 there is a conical surface 49 and a cylindrical surface 50, while in the clamping member 47 a clamping surface 51 is provided. The lower sides of the members 46 and 47 are provided with supporting or contact surfaces 52.

The supporting ring 2 between the annular chip grooves 3 and 4 is provided with a plurality of apertures 53 in accordance with the number of members 46 and 47. Into each of these apertures 53 a centering tube 54 is inserted with play so as to permit this centering tube to be shifted within this aperture to the proper position relative to the supporting ring 2 to which it is then to be secured. The lower end of each of these centering tubes 54 which projects downwardly from the supporting ring 2 is secured to the outer wall of a cylinder 55 of a hydraulic jack from which a piston rod 56 projects upwardly which is connected by a connecting socket 57 to a guide rod 58. The free upper end of this guide rod carries a substantially cylindrical centering head 59 which is provided with a conical lower surface 60 and has an outer diameter corresponding to the diameter of the inner cylindrical surface 50 of centering member 46. A transverse pin 61 projects laterally from the connecting socket 57 into a slot in the centering tube 54 and is adapted to limit the extent of the stroke of piston rod 56 by abutting against the ends of the slot.

The outer wall of cylinder 55 carries a control rod 61 on which two limit switches 62 and 63 are mounted which may be actuated by a control ring 64 which is screwed upon the lower end of piston rod 65 which projects from the lower end of cylinder 55. Control ring 64 as well as each of the limit switches 62 and 63 are individually adjustable to different positions in a vertical direction.

Clamping member 47 is operatively associated with a clamping head 66 which is likewise movable by means of another hydraulic jack 55 in the same manner as the centering head 59. The corresponding elements of both jacks and their associated parts are identified by the same numerals. In place of the single control ring 64, piston rod 65 of this other jack 55 carries two adjustable control rings.

The annular table 5 is to be driven by an intermittently driven motor or a hydraulic jack, not shown. After each step of the rotation of table 5, the latter may deviate approximately 5 mm. from the desired position.

Each work support carries at least one clamping appliance 33 for clamping a workpiece which is to be machined by the work units.

While the annular table 5 is stopped, the clamping appliance 33 adjacent to the arm 18 is released by the tightening and releasing unit 9 and a workpiece which has been completely machined by the work units is removed from the clamping appliance and then replaced by a new workpiece which is then clamped therein by the unit 9.

After the period has passed which is required for machining each workpiece at each of the work stations, the tool spindles 14 to 16 are retracted to their original positions, whereupon the annular work table 5 is turned at an angle of 72° so that the workpiece which has been inserted and clamped during the last stop will be moved to the first work station so as to be machined by the first group of work units 8, 10, and 13, while the other workpieces are advanced to the next work stations and the workpiece coming from the last work station arrives in a position opposite to the tightening and releasing unit 9.

Figure 5:
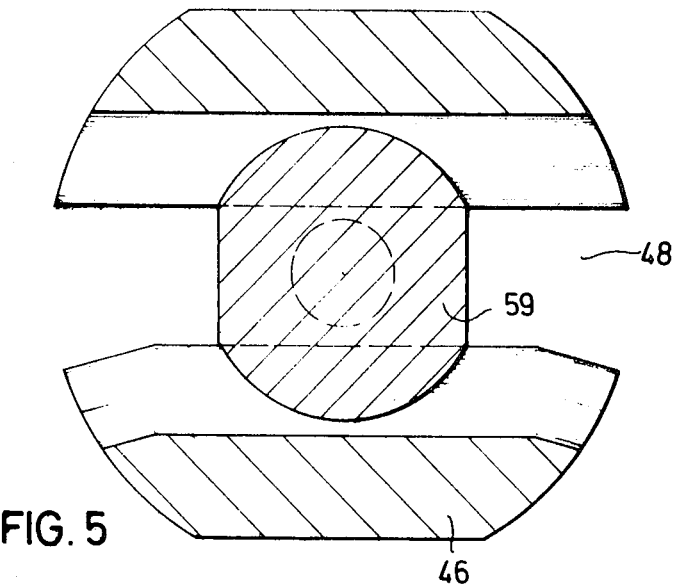
Figure 6:
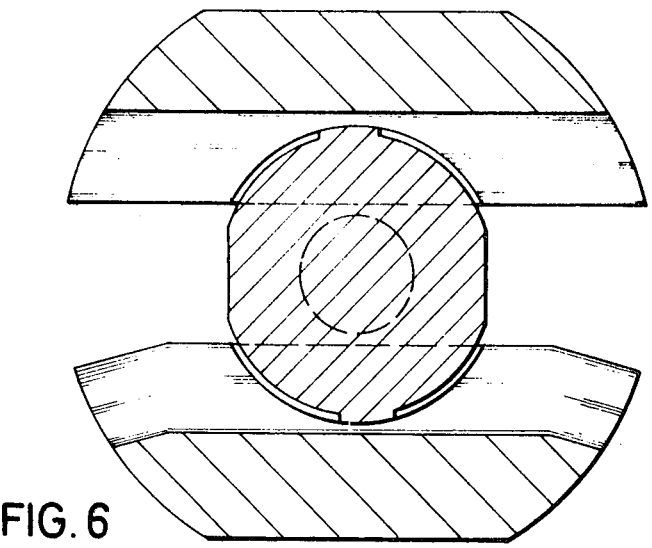
FIG. 6 shows a cross section similar to FIG. 5 of a modification of the device as shown in FIG. 5.

Before each workpiece is machined at each work station by the respective group of work units 8, 10, and 13, each work support 42 is adjusted to and locked in the required position. For this purpose, the hydraulic jacks 55 are actuated so as to move the centering head 59 downwardly so that the conical surface of centering head 59 engages with the conical surface 49 of the centering member 46 and thereby adjusts the work support 42 accurately to the required position relative to the work units 8, 10, and 13. The cylindrical surface of the centering head 49 then engages with the inner cylindrical surface 50 and the centering head presses the supporting surface 52 firmly upon the upper surface of the centering tube 54. At the same time, the clamping head 66 engages upon the clamping surface 51 so that the supporting surface 52 of clamping member 47 is pressed upon the upper end of the associated centering tube 54. Work support 42 and thus also the workpiece which is to be machined are thus securely clamped in the required position for the next machining operations of work units 8, 10, and 13 of that particular work station. When these operations are completed, jacks 55 are again actuated so as to lift the piston rods 56 whereby under the action of spring 44 the centering member 46 and the clamping member 47 are lifted off the centering tubes 54. The annular table 5 may then be turned to its next stop. The limit switches 62 and 63 serve for preventing any movement of the driving motor of the annular table 5 while the workpieces are being machined. In order to permit the guide rods 58 to be easily inserted into the T-shaped slots 48 in the centering member 46 and in the clamping member 47 the longitudinal part of each of these slots extending in the peripheral direction of work table 5 is made of a greater width at both ends, as shown in FIG. 5.

The individual work units 8, 10, and 13 are designed in a conventional manner for carrying out drilling, milling, countersinking, tapping, reaming, and similar operations on the workpieces. The chips which are produced during these operations are conveyed by suitable conveying means along the chip grooves 3 and 4 and pass along chutes into a chip box. For preventing the two centering members 46 and the clamping members 47 on each work support 42 from being soiled by chips, each work support 42 is provided with an angular guard plate, while laterally of the members 46 and 47 additional guard plates are provided, the upper sides of which are covered by the guard plates which are mounted on the work support 42. These guard plates are diagrammatically indicated in FIG. 3 by thick solid lines.

From the foregoing description it is evident that the machine according to the invention permits the workpieces on the individual work supports 42 to be accurately adjusted relative to the tools of the work units despite considerable deviations in the normal dimensions of the annular work table 5, inaccuracies of its intermittent movements, and thermal expansions to which it may be subjected.

Instead of being provided with only one tool spindle, each work unit may also be provided with several spindles or with a multiple-spindle head.

The machine according to the invention has a narrow annular table of a diameter of 1000 to 3500 mm. or more. The area of the machine which is surrounded by the annular work table may be employed for mounting thereon at least two work units with a common longitudinal axis. If the work table 5 has a diameter of about 1000 mm., the axial length of one work unit may amount to about 400 mm. If the work units are mounted at the inside and at the outside of the annular work table 5 and also vertically above the same, the workpieces may be machined simultaneously from three sides.

While the annular work table 5 of the machine as illustrated and described is rotatable at each step about an angle of 72°, the machine may also be provided with suitable means for turning this table at different angles. The angles between the individual stops at each work station may also vary from each other.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. In a machine tool for machining simultaneously at least two equal workpieces at points disposed at an angle to each other, said machine having a frame, an annular work table rotatable in steps on said frame at an adjustable frequency from one work station to another and having means for securing said workpieces on said table, and at least two groups of work units each disposed at one of said work stations, each of said work units having at least one work spindle and a separate motor for driving the spindles of each work unit, the improvement comprising a plurality of work supports on said work table in accordance with the number of groups of work units and spaced from each other at distances substantially equal to the sector angles between the work stations of adjacent groups, each of said workpieces being adapted to be secured to one of said work supports, means for connecting each of said work supports to said work table so as to be slidable thereon to a limited extent, said annular work table serving to both support said plurality of work supports and the workpieces located thereon as well as to index said plurality of work supports and workpieces from one work station to another, indexing means for adjusting each work support at each work station to the accurate position as required, clamping means for clamping each work support at each work station in the adjusted position, and control means for moving said indexing means and clamping means at each work station into engagement with said work support so as to adjust said work support to the required position and to clamp said work support in said required position.

2. In a machine tool for machining simultaneously at least two equal workpieces at points disposed at an angle to each other, said machine having a frame, an annular work table rotatable in steps on said frame at an adjustable frequency from one work station to another and having means for securing said workpieces on said table, and at least two groups of work units each disposed at one of said work stations, each of said work units having at least one work spindle and a separate motor for driving the spindles of each work unit, the improvement comprising a plurality of work supports on said work table in accordance with the number of groups of work units and spaced from each other at distances substantially equal to the sector angles between the work stations of adjacent groups, each of said workpieces being adapted to be secured to one of said work supports, means for connecting each of said work supports to said work table so as to be slidable thereon to a limited extent, indexing means for adjusting each work support at each work station to the accurate position as required, clamping means for clamping each work support at each work station in the adjusted position, and control means for moving said indexing means and clamping means at each work station into engagement with said work support so as to adjust said work support to the required position and to clamp said work support in said required position, each of said work supports having at least one aperture, said connecting means comprising at least one carrier member projecting from the upper side of said work table and engaging with a certain clearance into said aperture, and spring means intermediate said annular work table and each of said work supports tending to lift said work support off said work table and thus to move said work support in the direction opposite to the adjusting and clamping movement of said indexing and clamping means.

3. A machine tool as defined in claim 2, in which each of said work supports has at least one member secured thereto and projecting downwardly from its lower side laterally of a section of said annular work table, said projecting member having at least one longitudinal slot of a substantially T-shaped cross section extending in the peripheral direction of said work table, the horizontal part of said slot having at least one conical recess, said indexing and clamping means comprising at least one rod having a head adapted to engage into one open end of said slot when said work support is turned to one of said work stations, said head having a conical surface on its lower side adapted to engage with the surface of said conical recess so as to adjust said work table to the required position and to clamp the same in said position when said rod is drawn downwardly by said control means.

4. A machine tool as defined in claim 2, in which each of said work supports has a pair of members secured thereto and projecting downwardly from its lower side and disposed at both sides of a section of said annular work table, each of said projecting members having a longitudinal slot of a substantially T-shaped cross section extending in the peripheral direction of said work table, a first of said projecting members having at least one conical recess in the wall of the horizontal part of its slot, and the second projecting member having a clamping surface on the wall of the horizontal part of its slot, said indexing means comprising at least one indexing rod, and said clamping means comprising at least one clamping rod, each of said rods having a head adapted to engage into one open end of the associated slot when said work support is turned to one of said work stations, said head of said indexing rod having a conical surface on its lower side adapted to engage with the surface of said conical recess so as to adjust said work support to the required position when said indexing rod is drawn downwardly by said control means, and said head of said clamping rod having a clamping surface adapted to engage with the clamping surface on the wall of said slot of said second projecting member so as to clamp said work support in said required position when said clamping rod is drawn downwardly by said control means.

5. A machine tool as defined in claim 3 in which when said rod is drawn downwardly by said control means, said work support is likewise drawn downwardly against the action of said spring means and a surface on the lower end of said projecting member is then moved into supporting engagement with a stationary surface on said frame.

6. A machine tool as defined in claim 4, in which when said rods are drawn downwardly by said control means, said work support is likewise drawn downwardly against the action of said spring means and a surface on the lower end of each of said projecting members is then moved into supporting engagement with a stationary surface on said frame.

7. A machine tool as defined in claim 2, further comprising adjustable means for limiting the extent of the lifting movement of said work support off said annular work table.

8. A machine tool as defined in claim 3, in which said control means comprise a hydraulic jack having a cylinder and a piston, and a piston rod connected to said piston, a bushing secured in a fixed position to said frame for guiding said rod, the lower end of said bushing being connected to and carrying said cylinder, said rod being secured to said piston rod, and means on said piston rod and movable therewith for limiting the length of its stroke.

9. A machine tool as defined in claim 8, further comprising at least one limit switch mounted on said cylinder, said last means also being adapted to act upon and operate said switch.

10. A machine tool as defined in claim 4, in which said control means comprise a plurality of hydraulic jacks each having a cylinder and a piston, and a piston rod connected to said piston, bushings secured in a fixed position to said frame for guiding said indexing and clamping rods, the lower end of each of said bushings being connected to and carrying said cylinder of one of said jacks, said indexing rod and said clamping rod being secured to said piston rods of said jacks, and means on each of said piston rods and movable therewith for limiting the length of its stroke.

11. A machine tool as defined in claim 10, further comprising at least one limit switch mounted on said cylinder of at least one of said jacks, said last means on said piston rod of said jack also being adapted to act upon and operate said switch.

12. A machine tool as defined in claim 3, in which at least one end of each of said longitudinal slots is enlarged so as to permit said rods and the heads thereof to slide easily into said slot during the rotation of said work support.

13. A machine tool as defined in claim 4, in which at least one end of each of said longitudinal slots is enlarged so as to permit said indexing and clamping rods and the heads thereof to slide easily into said slots during the rotation of said work supports.

14. A machine tool as defined in claim 1, further comprising at least one clamping appliance on each of said work supports for clamping a workpiece.

15. A machine tool as defined in claim 14, further comprising means disposed at an additional station of said work table not containing any work units for tightening and loosening said clamping appliance on the respective work support stopping at said additional station.

References Cited
UNITED STATES PATENTS

| | | | |
|---|---|---|---|
| Re. 25,886 | 10/1965 | Cargill | 29—33.12 |
| 1,976,103 | 10/1934 | Archea | 29—38.1 |
| 3,271,840 | 9/1966 | Solski et al. | 29—33.12 |

ANDREW R. JUHASZ, Primary Examiner

Z. R. BILINSKY, Assistant Examiner

U.S. Cl. X.R.

77—64